United States Patent
Crews et al.

(10) Patent No.: US 9,145,510 B2
(45) Date of Patent: Sep. 29, 2015

(54) USE OF NANO-SIZED PHYLLOSILICATE MINERALS IN VISCOELASTIC SURFACTANT FLUIDS

(75) Inventors: James B. Crews, Willis, TX (US); Tianping Huang, Spring, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 825 days.

(21) Appl. No.: 13/226,328

(22) Filed: Sep. 6, 2011

(65) Prior Publication Data

US 2012/0048548 A1    Mar. 1, 2012

Related U.S. Application Data

(63) Continuation-in-part of application No. 11/755,549, filed on May 30, 2007, now abandoned.

(51) Int. Cl.
| | | |
|---|---|---|
| C09K 8/62 | (2006.01) | |
| E21B 43/25 | (2006.01) | |
| C09K 8/60 | (2006.01) | |
| C09K 8/14 | (2006.01) | |
| C09K 8/68 | (2006.01) | |
| C09K 8/70 | (2006.01) | |
| C09K 8/76 | (2006.01) | |

(Continued)

(52) U.S. Cl.
CPC ............... *C09K 8/602* (2013.01); *C09K 8/145* (2013.01); *C09K 8/68* (2013.01); *C09K 8/70* (2013.01); *C09K 8/76* (2013.01); *C09K 8/80* (2013.01); *C09K 8/845* (2013.01); *C09K 8/92* (2013.01); *C09K 2208/10* (2013.01); *C09K 2208/30* (2013.01)

(58) Field of Classification Search
None
See application file for complete search history.

(56) References Cited

U.S. PATENT DOCUMENTS

| 2,531,427 A | 11/1950 | Hauser |
| 4,105,578 A | 8/1978 | Finlayson et al. |

(Continued)

FOREIGN PATENT DOCUMENTS

| EP | 1634938 A1 | 3/2006 |
| WO | WO 9856497 A1 * | 12/1998 |

(Continued)

OTHER PUBLICATIONS

R. Bandyopadhyay, et al., "Effect of Silica Colloids on the Rheology of Viscoelastic Gels Formed by the Surfactant Cetyl Trimethylammonium Tosylate," Journal of Colloid and Interface Science, pp. 585-591, vol. 283 (2005).

(Continued)

*Primary Examiner* — John J Figueroa
(74) *Attorney, Agent, or Firm* — Mossman Kumar & Tyler PC

(57) ABSTRACT

Nano-sized clay minerals enhance the viscosity of aqueous fluids that have increased viscosity due to the presence of viscoelastic surfactants (VESs). In one non-limiting theory, the nano-sized phyllosilicate mineral viscosity enhancers associate, link, connect, or relate the VES elongated micelles into associations thereby increasing the viscosity of the fluid, possibly by mechanisms involving chemisorption or surface charge attractions. The nano-sized phyllosilicate mineral particles, also called clay mineral nanoparticles, may have irregular surface charges. The higher fluid viscosity is beneficial to crack the formation rock during a fracturing operation, to reduce fluid leakoff, and to carry high loading proppants to maintain the high conductivity of fractures.

8 Claims, 3 Drawing Sheets

(51) Int. Cl.
*C09K 8/80* (2006.01)
*C09K 8/84* (2006.01)
*C09K 8/92* (2006.01)

(56) References Cited

U.S. PATENT DOCUMENTS

| | | | |
|---|---|---|---|
| 4,287,086 A | | 9/1981 | Finlayson et al. |
| 4,434,076 A | | 2/1984 | Mardis et al. |
| 4,931,195 A | | 6/1990 | Cao et al. |
| 4,977,116 A | | 12/1990 | Rumpf et al. |
| 5,030,603 A | | 7/1991 | Rumpf et al. |
| RE34,371 E | * | 9/1993 | Rumpf et al. ............... 501/128 |
| 5,782,300 A | | 7/1998 | James et al. |
| 5,964,295 A | | 10/1999 | Brown et al. |
| 6,837,309 B2 | | 1/2005 | Boney et al. |
| 6,978,838 B2 | | 12/2005 | Parlar et al. |
| 7,081,439 B2 | | 7/2006 | Sullivan et al. |
| 7,265,079 B2 | | 9/2007 | Willberg et al. |
| 7,398,829 B2 | | 7/2008 | Hutchins et al. |
| 7,703,531 B2 | * | 4/2010 | Huang et al. ............. 166/308.3 |
| 2002/0004464 A1 | * | 1/2002 | Nelson et al. ................. 507/200 |
| 2003/0139298 A1 | * | 7/2003 | Fu et al. ...................... 507/200 |
| 2004/0063587 A1 | | 4/2004 | Horton et al. |
| 2005/0016726 A1 | * | 1/2005 | Nguyen et al. ................ 166/278 |
| 2005/0061509 A1 | * | 3/2005 | Nguyen ....................... 166/307 |
| 2005/0107265 A1 | * | 5/2005 | Sullivan et al. ............... 507/271 |
| 2005/0252658 A1 | | 11/2005 | Willingham et al. |
| 2005/0252659 A1 | | 11/2005 | Sullivan et al. |
| 2006/0016598 A1 | * | 1/2006 | Urbanek ..................... 166/280.2 |
| 2006/0211776 A1 | * | 9/2006 | Crews .......................... 516/194 |
| 2006/0272816 A1 | * | 12/2006 | Willberg et al. ............. 166/279 |
| 2007/0023187 A1 | * | 2/2007 | Canova et al. ............. 166/280.2 |
| 2007/0036977 A1 | * | 2/2007 | Sinclair et al. ................ 428/403 |
| 2007/0066491 A1 | * | 3/2007 | Bicerano et al. .............. 507/117 |
| 2007/0202318 A1 | * | 8/2007 | Smith et al. ................... 428/323 |
| 2008/0023201 A1 | | 1/2008 | Huang et al. |
| 2008/0058228 A1 | * | 3/2008 | Wilson ......................... 507/140 |
| 2008/0060812 A1 | | 3/2008 | Huang et al. |
| 2008/0220995 A1 | | 9/2008 | Huang et al. |
| 2008/0300153 A1 | * | 12/2008 | Crews et al. ................. 507/269 |
| 2009/0308610 A1 | * | 12/2009 | Windebank et al. ....... 166/280.2 |

FOREIGN PATENT DOCUMENTS

| | | |
|---|---|---|
| WO | 2005112580 A2 | 12/2005 |
| WO | 2006129528 A1 | 12/2006 |

OTHER PUBLICATIONS

Notification of International Preliminary Report on Patentability and Written Opinion submitted in PCT/US2008/066487, dated Dec. 10, 2009 (9 pp).

* cited by examiner

USE OF NANO-SIZED PHYLLOSILICATE MINERALS IN VISCOELASTIC SURFACTANT FLUIDS

CROSS-REFERENCE TO RELATED APPLICATION

This application is a continuation-in-part application from U.S. Ser. No. 11/755,549 filed on May 30, 2007, now abandoned.

TECHNICAL FIELD

The present invention relates to aqueous, viscoelastic fluids used during hydrocarbon recovery operations, and more particularly relates, in one embodiment, to methods and additives for increasing the viscosity of fluids gelled with viscoelastic surfactants.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. Certain surfactants in particular proportions and conditions will self-assemble into micelles. When the micelles are elongated or "rod-like", their entanglement increases viscosity of the fluid in which they reside. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue.

However, the same property that makes VES fluids less damaging tends to result in significantly higher fluid leakage into the reservoir matrix, which reduces the efficiency of the fluid especially during VES fracturing treatments. Increasing the viscosity of the VES-gelled fluids would reduce their tendency to leak into the formation. Thus, it would be desirable if methods or additives were developed to enhance or increase the viscosity of the VES-gelled fluids.

SUMMARY

There is provided, in one form, a method for treating a subterranean formation that involves providing an aqueous viscoelastic treating fluid which includes an aqueous base fluid or brine, a viscoelastic surfactant (VES) gelling agent, and a phyllosilicate mineral particle viscosity enhancer. The VES gelling agent is present in an amount effective to increase the viscosity of the aqueous base fluid by forming elongated micelles. Suitable phyllosilicate mineral particle viscosity enhancers include, but are not limited to, montmorillonites, bentonites, kaolinites, smectites, chlorites, illites, mixed layer clays of the foregoing identified clays, and mixtures thereof. The aqueous viscoelastic surfactant treating fluid is injected the through a wellbore and into the subterranean formation, and the subterranean formation is thus treated by the fluid. The phyllosilicate particles may have an average particle size between about 1 and about 1000 nanometers, or less than 1000 nm. The phyllosilicate mineral particle viscosity enhancer is present in an amount effective to improve viscosity of the fluid as compared with an identical fluid absent the clay mineral particle viscosity enhancer by associating the micelles together in an association There is further provided in another non-limiting embodiment an aqueous viscoelastic treating fluid that includes an aqueous base fluid or brine, a viscoelastic surfactant (VES) gelling agent, and a clay mineral viscosity enhancer that again may include montmorillonites, kaolinites, smectites, chlorites, illites, mixed layer clays of the foregoing clay minerals, and mixtures thereof. Once more, the VES gelling agent is present in an amount effective to increase the viscosity of the aqueous base fluid by forming elongated micelles. The clay mineral particle viscosity enhancer has an average particle size ranging from about 1 to about 1000 nanometers, and is present in an amount effective to improve viscosity of the fluid as compared with an identical fluid absent the nano-sized clay phyllosilicate mineral particle viscosity enhancer by associating the micelles together in an association. The "clay mineral particle viscosity enhancer" is also termed herein "nano-sized phyllosilicate mineral", and these terms should be considered the same and interchangeable.

The nano-sized clay mineral viscosity enhancers appear to help enhance the fluid viscosity and develop a pseudo-filter cake of VES micelles by associating with them as well as ions and particles to produce a novel and unusual viscous fluid layer of pseudo-crosslinked elongated micelles on the reservoir face that limits further VES fluid leak-off. Additionally, the art may be further advanced by use of viscosity enhancers that also form a similar viscous fluid layer of pseudo-crosslinked micelles on the formation face effective in controlling the rate of VES fluid loss, yet can be less pore plugging or non-pore plugging and physically easier to produce back with the VES fluid after a VES treatment, as compared to using polymers. That is, the effectiveness of the method is largely independent of the size of the viscosity enhancers.

DETAILED DESCRIPTION

Figure 1:
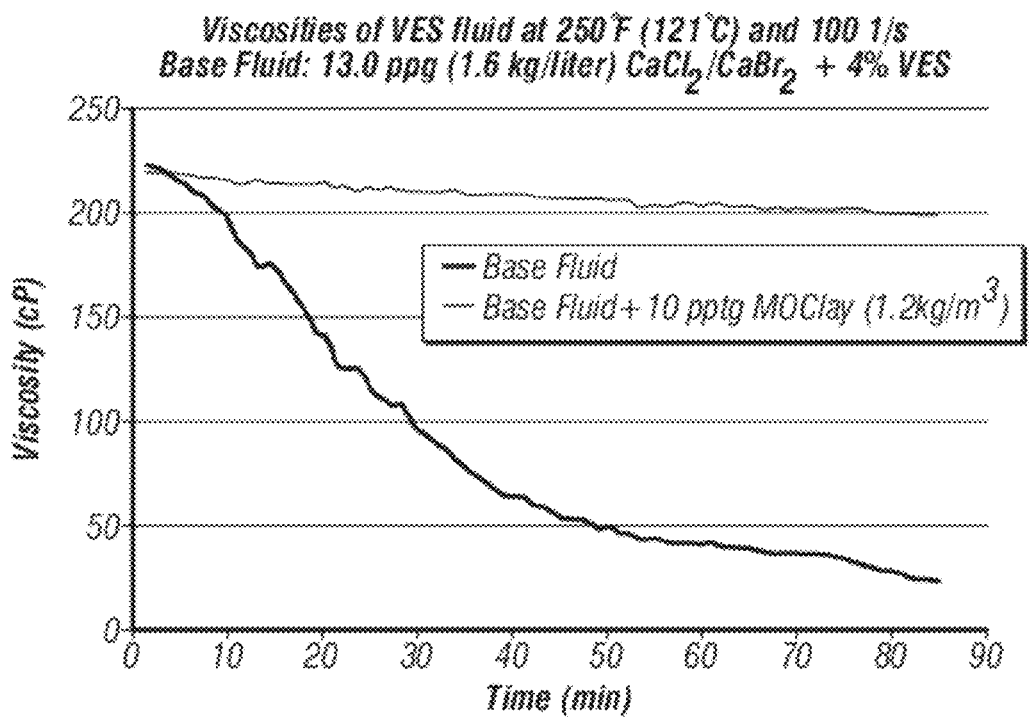
FIG. 1 is a graph of the viscosity over time of two viscoelastic brine fluids containing, one of which has 10 pptg (1.2 kg/m$^3$) montmorillonite nano-sized clay particles, and one which does not.

It has been discovered that the addition of nano-sized phyllosilicate mineral particles to an aqueous VES fluid demonstrates improved, enhanced or increased viscosity of the VES fluid. The viscosity enhancers herein are believed to be particularly useful in VES-gelled fluids used for well completion or stimulation and other uses and applications where the viscosity of VES-gelled aqueous fluids may be increased. The VES-gelled fluids may further comprise proppants or gravel, if they are intended for use as fracturing fluids or gravel packing fluids, respectively, although such uses do not require that the fluids include proppants or gravel in some embodiments. It is especially useful that the phyllosilicate viscosity enhancer particles are very small, which permits their removal from the formation to be easy and complete causing little or no damage to the formation.

In one non-limiting explanation or theory, the nano-sized phyllosilicate mineral particles have or bear electrical charges on their surfaces, possibly due to their irregular crystal structures. The particles with surface charges associate, connect or link the VES micelles, thus further increasing their 3-D network and enhancing the viscosity of the fluid system. In one non-limiting explanation, chemisorption and/or surface charge attraction are believed to be mechanisms involved in the VES micelle association. It is this VES micelle association structure, sometimes called "pseudo-crosslinked", that is believed to enhance the viscosity of the gelled aqueous viscoelastic treating fluid. Such clay particles are believed to work at elevated temperatures. In particular, the VES-gelled aqueous fluids have improved (increased, enhanced or raised) viscosity over a broad range of temperatures, such as from about 70 (about 21° C.) to about 400° F. (about 204° C.); alternatively up to about 350° F. (about 177° C.), and in another non-limiting embodiment up to about 300° F. (about 149° C.).

This discovery allows the VES system to have improved fluid viscosity and reduced fluid loss to help minimize formation damage during well completion or stimulation operations. That is, the introduction of these nano-sized clay mineral viscosity enhancers to the VES-gelled aqueous system will limit and reduce the amount of VES fluid which leaks-off into the pores of a reservoir during a fracturing or frac-packing treatment, thus minimizing the formation damage that may occur by the VES fluid within the reservoir pores. Also, limiting the amount of VES fluid that leaks-off into the reservoir during a treatment will allow more fluid to remain within the fracture and thus less total fluid volume will be required for the treatment. Having less fluid leaking-off and more fluid remaining within the fracture will enable greater fracture size and geometry to be generated. Enhancing the fluid viscosity of the VES-gelled fluids also helps reduce the amount of VES necessary to achieve a particular viscosity level. Thus, the use of these nano-sized phyllosilicate mineral viscosity enhancers in a VES-gelled aqueous system may improve the performance of the VES fluid while lowering fracturing treatment cost.

Prior art VES-gelled aqueous fluids, being non-wall-building fluids (i.e. there is no polymer or similar material build-up on the formation face to form a filter cake) that do not build a true filter cake on the formation face, have viscosity controlled fluid leak-off into the reservoir. By contrast, the methods and compositions herein use a nano-sized phyllosilicate mineral viscosity enhancer that is believed to associate with the VES micelle structures through particle surface charge attraction, allowing pseudo-crosslinking of the elongated micelles to occur, in one non-limiting explanation of the mechanisms at work herein. This unique association of elongated micelles has been found to form a highly viscous layer of crosslinked-like VES fluid on the formation face, thus acting as a pseudo-filter cake layer that limits, inhibits and controls additional VES fluid from leaking-off into the reservoir pores (see FIGS. 3 and 4). The pseudo-filter cake is composed of VES micelles that have VES surfactants with very low molecular weights of less than 1000. This is in contrast to and different from polymeric fluids that form true polymer mass accumulation-type filter cakes by having very high molecular weight polymers (1 to 3 million molecular weight) that due to their size are not able to penetrate the reservoir pores, but bridge-off and restrict fluid flow in the pores.

The nano-sized clay mineral viscosity enhancers herein associate with the VES micelles and as VES fluid is leaked-off into the reservoir a viscous layer or association of micelles and viscosity enhancer particles and/or ions accumulate on the formation face, thus reducing the rate of VES fluid leak-off. It has been discovered that particulate plugging of the reservoir pores may not be the mechanism of leak-off control or the mechanism that allows development of the viscous micelle layer. Tests using nanometer-sized clay mineral viscosity enhancer particles (on the order of $10^{-9}$ to $10^{-8}$ meters), that have no potential to bridge or plug reservoir pores of 0.1 mD or higher reservoir permeability, develop the viscous micelle layer.

In the method of the invention, an aqueous fracturing fluid, as a non-limiting example, is prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, in a non-limiting example.

The aqueous fluids gelled by the VESs herein may optionally be brines. In one non-limiting embodiment, the brines may be prepared using salts including, but not necessarily limited to, NaCl, KCl, CaCl$_2$, MgCl$_2$, NH$_4$Cl, CaBr$_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and CaCl$_2$ or NaCl, CaCl$_2$, and CaBr$_2$ as non-limiting examples.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN$^+$(R')$_2$O$^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. By independently it is meant that each R' may be the listed possibilities and need not be the same as the other. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™ which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Hughes as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Hughes.

The amount of VES included in the fracturing fluid depends on two factors. One involves generating, creating or producing enough viscosity to control the rate of fluid leak off into the pores of the fracture, which is also dependent on the type and amount of fluid loss control agent and/or nano-sized clay particle viscosity enhancer used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the compositions and methods herein is from about 1.0 independently to about 6.0% by volume VES product. In an alternate, non-restrictive form, the amount of VES ranges from 2 independently to about 10 volume %. The term "independently" when used herein with respect to parameter ranges means that any lower threshold may be used together with any upper threshold to give a suitable alternative range.

The viscosity enhancers useful herein include, but are not necessarily limited to, nano-sized natural and synthetic phyllosilicate clay mineral viscosity enhancers. In one non-limiting embodiment the clay particles may have an average particle size of 1000 nanometers or less, in part for assurance that they are less pore plugging or non-pore plugging particles, that is, substantially reduced or not damaging to the formation that the fluid contacts. Nano-scale particles are easier to flow in and out of underground porous media and less prone to plug flow channels of oil and gas. The clay particles may also be packaged or composed as a slurry product for ease of addition and salts may be present in the slurry as dispersants to prevent clay flocculation during commercial storage and used within VES fluids.

The chemisorption and/or surface charge character of the phyllosilicate clay particles is believed to vary widely, allowing for a wide range of charged surface submicron or nano-sized particles to select from for modifying the properties of VES gelled aqueous fluids. Thus, it is expected that more than one nano-sized clay particle type may be mixed together, and possibly also with pyroelectric and/or piezoelectric particles to tailor the viscosity enhancers to the needs of the system. Suitable phyllosilicate minerals, natural and synthetic, may include, but are not necessarily limited to, montmorillonites, bentonites, kaolinites, smectites, chlorites, illites, mixed layer clays of the foregoing clay minerals, and the like and mixtures thereof. The surface charges of the clay particles are believed to come from ionic substitutions in the tetrahedral and/or octahedral sheet crystal structures and/or surface defects, and thus the particles may be said to have ionic surfaces.

In another non-restrictive embodiment, the surface of the clay particles should have a cation exchange capacity (CEC) that attracts positively charged ions. It is not necessary for the clay particles to have high CEC and surface charge (although they may be), but having this ability is an indicator that the clay may function as a suitable viscosity enhancer. In one non-limiting example, the clay surface may be modified, either partially or completely, such as made partially or completely hydrophobic by the addition of or treatment with a quaternary amine surfactant to the clay. The more quaternary amine surfactant used to modify the clay surface, the more hydrophobic the clay surface will become. By the term "completely hydrophobic" is meant that the surface cannot be made more hydrophobic beyond that point. Additionally, the clay surfaces may also be modified using surface active agents besides salinity (i.e. agents containing Ca, Mg, Na, K and the like), such as siloxanes, sulfonates, sorbitan esters, fatty acids, and the like, in non-restrictive examples.

In one non-limiting explanation, when the VES fluid mixed with very small phyllosilicate mineral particles, such as nano-sized montmorillonite, is pumped downhole into underground formations the surface charges present permit the clay particles to associate, link, connect or otherwise relate the VES micelles together to increase fluid viscosity. The association or relation of the elongated micelles is thought to be roughly analogous to the crosslinking of polymer molecules by crosslinkers. The high fluid viscosity is helpful and beneficial to crack the formation rock (such as in a fracturing operation), reduce fluid leakoff and carry high loadings of proppants to maintain the high conductivity of the fractures. After the fracturing job is done, in one non-limiting embodiment, the internal breakers in the VES fluid break the VES micelles and the nano-sized clay particles flow back with the producing fluids. Very little or no formation damage is expected from the use of the nano-sized viscosity enhancer particles.

In another non-limiting embodiment, the viscosity enhancers herein do not include the suspension of colloidal particles employed in U.S. Pat. No. 7,081,439. More specifically, the viscosity enhancers herein do not include colloidal particles comprising a material selected from the group consisting of silica, aluminum oxide, antimony oxide, tin oxide, cerium oxide, yttrium oxide and zirconium oxide, nor mica. In another non-limiting embodiment, the gelled aqueous viscoelastic treating fluid has an absence of added silica prior to its injecting through a wellbore and into a subterranean formation. While silica may become present in the gelled aqueous viscoelastic treating fluid from outside sources, such as the subterranean formation itself, no silica is intentionally added to the fluid.

In one non-restrictive embodiment, the amount of clay mineral viscosity enhancer ranges from about 0.1 to about 500 pounds per thousand gallons (pptg) (about 0.012 to about 60 kg/m$^3$) based on the aqueous viscoelastic treating fluid.

In another non-restrictive embodiment, the amount of viscosity enhancer may have a lower limit of about 0.5 pptg (about 0.06 kg/m$^3$) and independently an upper limit of about 100 pptg (about 12 kg/m$^3$) or 200 pptg (about 24 kg/m$^3$), and in another non-restrictive version a lower limit of about 1 pptg (about 0.12 kg/m$^3$) and independently an upper limit of about 50 pptg (about 6 kg/m$^3$), and in still another non-limiting embodiment, a lower limit of about 2 pptg (about 0.2 kg/m$^3$) and independently an upper limit of about 20 pptg (about 2.4 kg/m$^3$).

In another non-limiting embodiment, the average particle size of the viscosity enhancers ranges between about 1 nanometer independently up to about 1000 nanometers; alternatively less than 1000 nanometers, and in another non-restrictive version from about 10 nanometers independently up to about 500 nanometers. For instance, an average particle size range of from 15 nanometers independently up to about 250 nanometers would also be suitable.

It turns out that the particle size distribution of the viscosity enhancer is probably not a major factor for increasing viscosity and fluid loss control in VES-gelled fluids. In one non-limiting explanation, it appears that the clay particles have negative charges on the surface thereof due to their crystal structure defects. These negative charges will attract the cationic part in the micelle of VES-gelled fluids and form a relatively strong 3D micellar-particle network that increases fluid viscosity and limits fluid flow into the pore throats of porous formation to reduce the VES fluid loss. The surface charges of viscosity enhancer particles associating with the micelles of VES-gelled fluids form an association, e.g. a viscous layer or a pseudo-filter cake on the rock surface to block fluid flowing into the rock. Another advantage for the clay particles being a good viscosity enhancer in VES-gelled fluids is that they are sufficiently small and may be easily removed during production; therefore, minimizing formation damage that can occur as compared with other known fluid loss control additives or systems.

In hydraulic fracturing applications, propping agents are typically added to the base fluid after the addition of the VES. The proppants, solid particles or gravel may be any solid particulate matter suitable for its intended purpose, for example as a screen or proppant, etc. Propping agents include, but are not limited to, for instance, quartz sand grains, glass and ceramic beads, bauxite grains, walnut shell fragments, aluminum pellets, nylon pellets, sized calcium carbonate, other sized salts, and the like. The propping agents are normally used in concentrations between about 1 to 14 pounds per gallon (120-1700 kg/m$^3$) of fracturing fluid composition, but higher or lower concentrations may be used as the fracture design requires. The base fluid can also contain other conventional additives common to the well service industry such as water wetting surfactants, non-emulsifiers and the like. In the compositions and methods herein, the base fluid may also contain additives which can contribute to breaking the gel (reducing the viscosity) of the VES fluid, also known as internal breakers. External breakers added separately may also be used, but are generally less advantageous.

While the viscoelastic fluids of the invention are described most typically herein as having use in fracturing fluids, it is expected that they will also find utility in completion fluids, gravel pack fluids, fluid loss pills, lost circulation pills, diverter fluids, foamed fluids, stimulation fluids and the like.

In another embodiment of the invention, the treatment fluid may contain other viscosifying agents, other different surfactants, clay stabilization additives, scale dissolvers, biopolymer degradation additives, and other common and/or optional components.

In a more preferable embodiment of the methods and compositions herein, use with internal VES breakers can have synergistic clean-up effects for the viscosity enhancers and the VES fluid. Use of the viscosity enhancers herein with an internal breaker may allow less VES fluid to leak-off into the reservoir, thus resulting in less fluid needed to be broken and removed once the treatment is over. Additionally, use of an internal breaker within the VES micelles may further enhance the breaking and removal of the pseudo-filter cake viscous VES layer that develops on the formation face with the viscosity enhancers of this invention. Lab tests to date appear to show that the viscous VES pseudo-filter cake has the micelles readily broken down to the relatively non-viscous, more spherically-shaped micelles by use of an internal breaker, and also with use of an encapsulated breaker, if employed.

In an optional embodiment, the aqueous viscoelastic treating fluid herein has an absence of scale resistant proppants such as those described in U.S. Patent Application Publication No. 2006/0272816, incorporated by reference herein in its entirety. Further, unlike the substrates discussed in U.S. Patent Application Publication No. 2006/0272816 which are taught as being inert to components in the subterranean formation such as well treatment fluids, the clay mineral particle viscosity enhancers herein are not inert, but instead interact with the elongated VES micelles and associate them together, for instance connect them into associations (e.g. layers or pseudo-filter cakes) to improve viscosity. In an alternative optional embodiment, the aqueous viscoelastic treating fluid herein has an absence of proppants that are a mixture of sintered kaolin clay and amorphous to micro-crystalline silica, such as those described in U.S. Pat. No. Re. 34,371 incorporated by reference herein in its entirety.

The invention will be further described with respect to the following Examples which are not meant to limit the invention, but rather to further illustrate the various embodiments.

EXAMPLES

Figure 2:
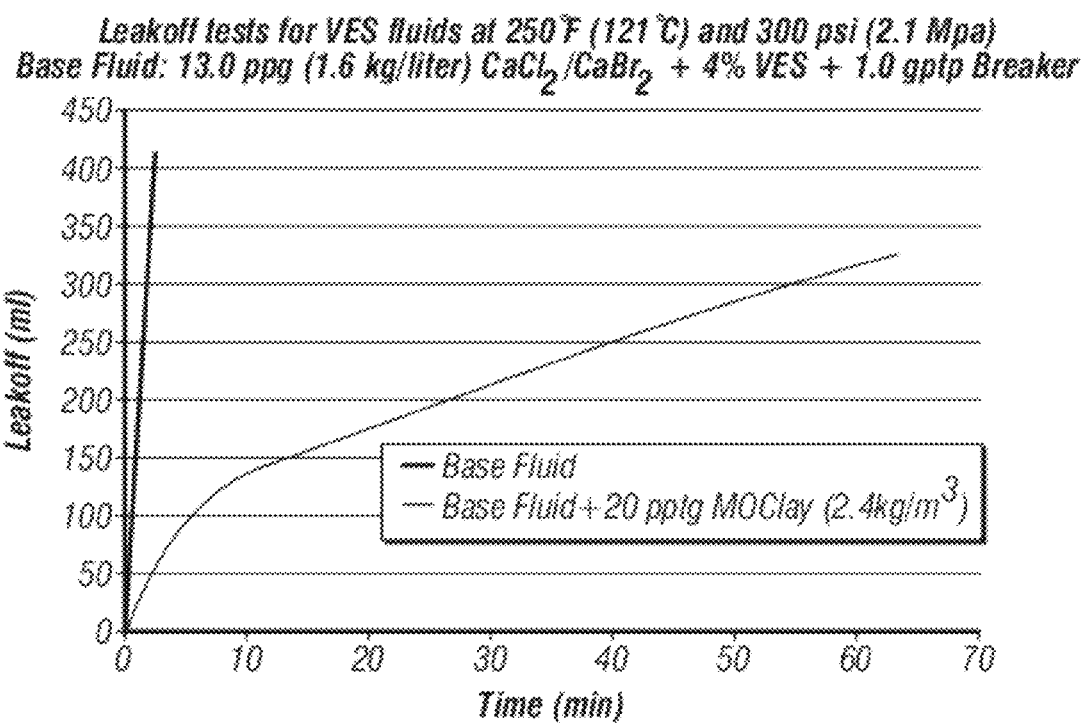
FIG. 2 is a graph of fluid leakoff in milliliters as a function of time for two viscoelastic brine fluids, where one does not contain a nano-sized clay mineral, and an otherwise identical fluid that contains 20 pptg (2.4 kg/m$^3$) montmorillonite nano-sized clay particles.

The results of laboratory tests, as presented in FIGS. 1 and 2, show that nano-sized clay mineral viscosity enhancers, such as montmorillonite, may significantly improve the viscosity of VES-gelled aqueous fluids.

FIG. 1 presents a graph of the viscosity of two viscoelastic 13.0 ppg (1.6 kg/liter) $CaCl_2/CaBr_2$ brine fluids containing 4% VES, measured at 250° F. (121° C.) and 100 1/s over time. The fluid represented by the black curve does not have a viscosity enhancer, and it may be readily seen that the viscosity diminishes relatively rapidly over time. The other, gray curve, represents a fluid containing 10 pptg (1.2 kg/m$^3$) montmorillonite nano-sized clay particles. The clay particles are MO Clay product, Mineral Colloid MO, a high purity montmorillonite, which is a product of Southern Clay Products, Inc. The particle size is less than 1000 nanometers. It is clear that the fluid with the montmorillonite clay particles generally maintains viscosity at or above 200 cP over the test period, demonstrating that these clay particles do enhance viscosity.

FIG. 2 shows a graph of fluid leakoff in milliliters as a function of time for two viscoelastic 13.0 ppg (1.6 kg/liter) $CaCl_2/CaBr_2$ brine fluids containing 4% VES, measured at 250° F. (121° C.) and 100 1/s. These fluids have 1.0 gptg GBW-407L (Fish Oil 18:12 product from Bioriginal Food & Science Corporation) internal breaker. Again, the fluid represented by the black curve does not contain a nano-sized clay mineral and shows rapid leakoff. The fluid represented by the gray curve contains 20 pptg (2.4 kg/m$^3$) MO Clay montmorillonite nano-sized clay particles, and it may be seen that the fluid leakoff is much more gradual.

Figure 3:
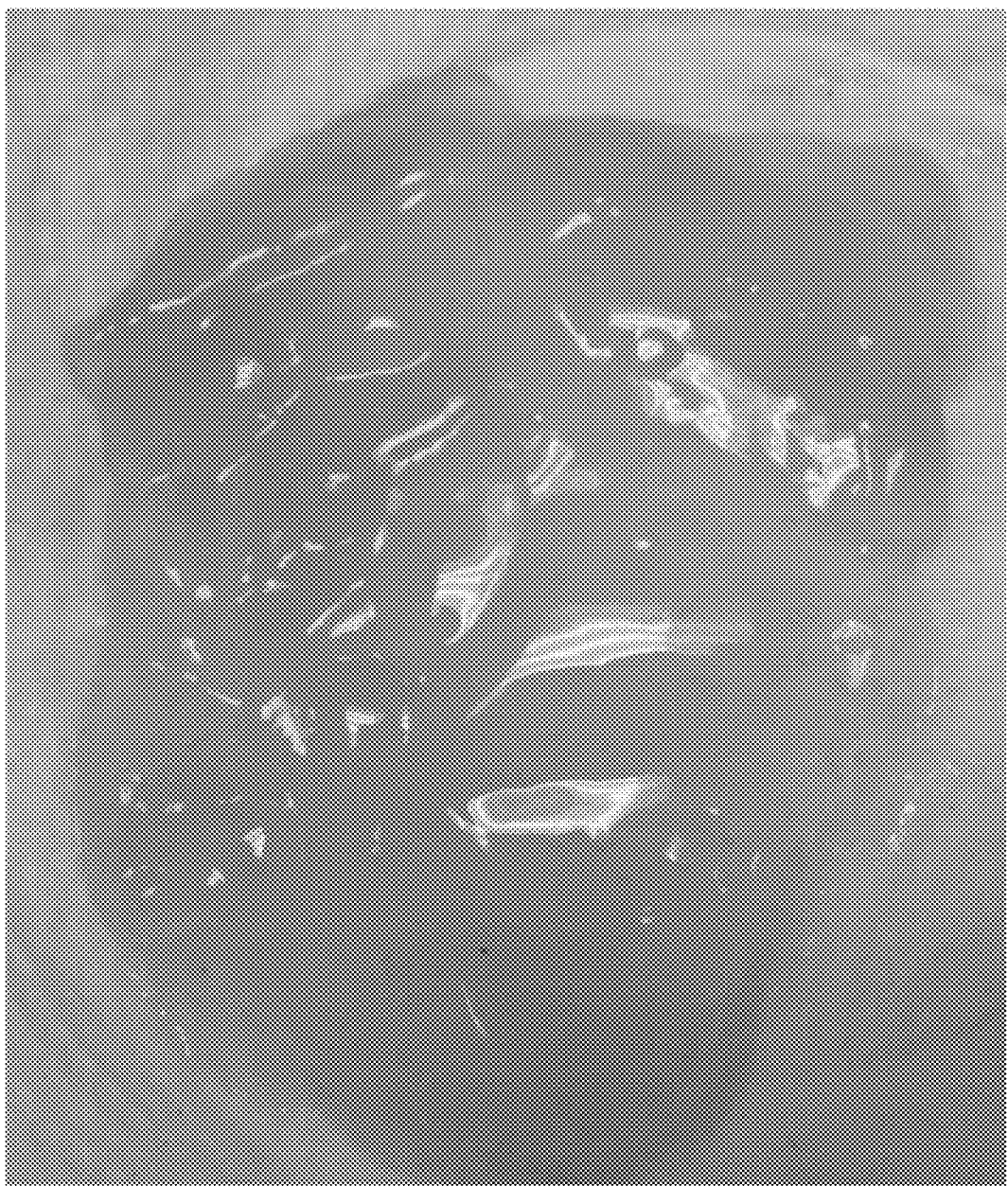
FIG. 3 is a photograph of a viscous layer of pseudo-filter cake.

FIG. 3 is a photograph of a viscous layer of pseudo-filter cake, which is built from 13.0 ppg (1.6 kg/liter) $CaCl_2/CaBr_2$ brine fluid containing 4% VES, 1 gptg GBW-407L internal breaker and 20 pptg (2.4 kg/m$^3$) MO Clay at 250° F. (121° C.) and 300 psi (2.1 MPa). This photograph demonstrates that the charges in the platelets of the montmorillonite clay associate with the VES micelles to build pseudo-filter cake to control fluid leakoff.

Figure 4:
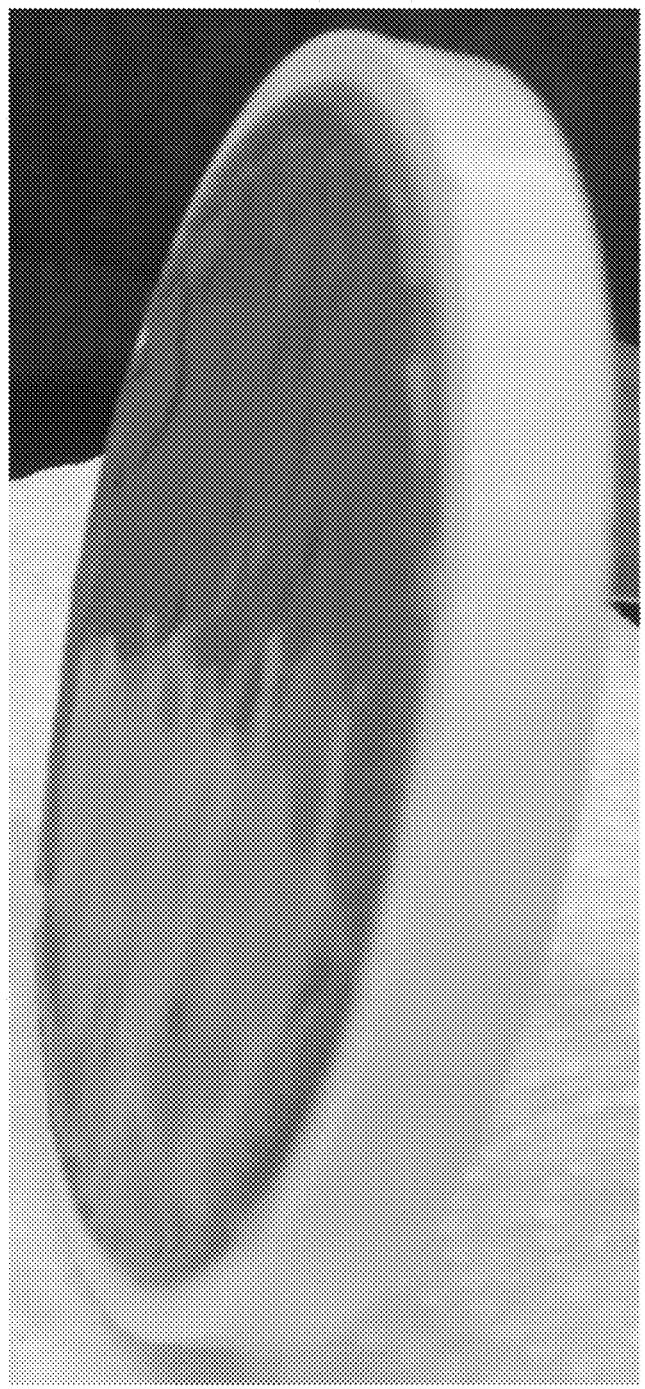
FIG. 4 is another photograph of a pseudo-filter cake built on a 400 mD ceramic disc.

FIG. 4 is another photograph of a pseudo-filter cake built on a 400 mD ceramic disc from 13.0 ppg (1.6 kg/liter) $CaCl_2/CaBr_2$ brine fluid containing 4% VES, and 20 pptg (2.4 kg/m$^3$) MO Clay at 250° F. (121° C.) and 300 psi (2.1 MPa). This is this the same fluid as that used in the FIG. 3 photograph. This photograph also demonstrates that the charges in the platelets of the montmorillonite clay associate with the VES micelles to build pseudo-filter cake to control fluid leakoff, and that the viscous pseudo-filter cake clings to the nearly vertical disk.

In the foregoing specification, the invention has been described with reference to specific embodiments thereof, and has been demonstrated as effective in improving or enhancing viscosity for VES gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, nano-sized clay mineral viscosity enhancers and other components falling within the claimed parameters, but not specifically identified or tried in a particular composition, are anticipated to be within the scope of this invention.

The words "comprising" and "comprises" as used throughout the claims is to be interpreted as "including but not limited to".

The present invention may suitably comprise, consist or consist essentially of the elements disclosed and may be practiced in the absence of an element not disclosed. For instance, the gelled aqueous viscoelastic treating fluid may consist of or consist essentially of an aqueous base fluid, a viscoelastic surfactant (VES) gelling agent in an amount effective to increase the viscosity of the aqueous base fluid by forming elongated micelles, and a clay mineral (phyllosilicate) particle viscosity enhancer, where the clay mineral particle viscosity enhancer has an average particle size ranging from about 1 to about 1000 nanometers, where the clay mineral particle viscosity enhancer is present in an amount effective to improve viscosity of the fluid as compared with an identical fluid absent the clay particle viscosity enhancer by associating the micelles together in an association, Alternatively, the aqueous viscoelastic treating fluid may consist of or consist essentially of a brine aqueous base fluid, a viscoelastic surfactant (VES) gelling agent in an amount effective to increase the viscosity of the aqueous base fluid by forming elongated micelles, and a phyllosilicate mineral particle viscosity enhancer selected from the group consisting of montmorillonites, bentonites, zeolites, kaolinites, smectites, chlorites, illites, mixed layer clays of the foregoing clay minerals, quartz, ceramics, and mixtures thereof, where the phyllosilicate mineral particle viscosity enhancer has an average particle size ranging from about 1 to about 1000 nanometers, in an amount effective to improve viscosity of the fluid as compared with an identical fluid absent the viscosity enhancer, and the phyllosilicate mineral particle viscosity enhancer has an absence of scale resistant proppants and an absence of proppants that are a mixture of kaolin clay and amorphous to micro-crystalline silica.

What is claimed is:

1. A method for treating a subterranean formation comprising:
    injecting a gelled aqueous viscoelastic surfactant treating fluid through a wellbore and into the subterranean formation, where the gelled aqueous viscoelastic treating fluid comprises:
        an aqueous base fluid;
        a viscoelastic surfactant (VES) gelling agent in an amount effective to increase the viscosity of the aqueous base fluid by forming elongated micelles; and
        a phyllosilicate mineral particle viscosity enhancer selected from the group consisting of montmorillonites, bentonites, smectites, chlorites, illites, mixed layer clays of the foregoing, and mixtures thereof, where the phyllosilicate mineral particle viscosity enhancer has an average particle size ranging from about 1 to about 1000 nanometers, where the phyllosilicate mineral particle viscosity enhancer is present in an amount of from about 0.1 to about 500 pptg (about 0.012 to about 60 kg/m$^3$) based on the total aqueous viscoelastic treating fluid,
    where the aqueous viscoelastic treating fluid has an absence of scale resistant proppants; and an absence of proppants that are a mixture of kaolin clay and amorphous to micro-crystalline silica; and an absence of added silica prior to the injecting; and
    treating the subterranean formation.

2. The method of claim 1 where the phyllosilicate mineral particle viscosity enhancer has been modified to be hydrophobic.

3. The method of claim 1 where treating the subterranean formation is selected from the group consisting of:
- fracturing the formation under an effective pressure where the aqueous viscoelastic treating fluid further comprises a proppant;
- packing the formation with gravel where the aqueous viscoelastic treating fluid further comprises gravel;
- stimulating the formation where the aqueous viscoelastic treating fluid further comprises a stimulating agent;
- completing a well; and
- controlling fluid loss where the aqueous viscoelastic treating fluid further comprises a component selected from the group consisting of a salt, an easily removed solid, and a mixture thereof.

4. The method of claim 1 where the aqueous viscoelastic treating fluid further comprises at least one internal breaker.

5. The method of claim 1 where for a period of time during the method the aqueous viscoelastic treating fluid is at a temperature of from about 70° F. to about 400° F. (about 21 to about 204° C.).

6. A method for treating a subterranean formation comprising:
- injecting the aqueous viscoelastic surfactant treating fluid through a wellbore and into the subterranean formation, where the aqueous viscoelastic treating fluid comprises:
  - a brine aqueous base fluid;
  - a viscoelastic surfactant (VES) gelling agent in an amount effective to increase the viscosity of the aqueous base fluid by forming elongated micelles; and
  - a phyllosilicate mineral particle viscosity enhancer selected from the group consisting of montmorillonites, bentonites, smectites, chlorites, illites, mixed layer clays of the foregoing, and mixtures thereof, where the phyllosilicate mineral particle viscosity enhancer has an average particle size ranging from about 1 to about 1000 nanometers, in an amount from about 0.1 to about 500 pptg (about 0.012 to about 60 kg/m$^3$) based on the total aqueous viscoelastic treating fluid, and the phyllosilicate mineral particle viscosity enhancer has an absence of scale resistant proppants and an absence of proppants that are a mixture of kaolin clay and amorphous to micro-crystalline silica;
- where the gelled aqueous viscoelastic treating fluid has an absence of added silica prior to the injecting; and
- treating the subterranean formation.

7. The method of claim 6 where treating the subterranean formation is selected from the group consisting of:
- fracturing the formation under an effective pressure where the aqueous viscoelastic treating fluid further comprises a proppant;
- packing the formation with gravel where the aqueous viscoelastic treating fluid further comprises gravel;
- stimulating the formation where the aqueous viscoelastic treating fluid further comprises a stimulating agent;
- completing a well; and
- controlling fluid loss where the aqueous viscoelastic treating fluid further comprises a component selected from the group consisting of a salt, an easily removed solid, and a mixture thereof.

8. The method of claim 6 where for a period of time during the method the aqueous viscoelastic treating fluid is at a temperature of from about 70° F. to about 400° F. (about 21 to about 204° C.).

* * * * *